United States Patent [19]
Nishimura

[11] Patent Number: 5,862,416
[45] Date of Patent: Jan. 19, 1999

[54] HELICOID STRUCTURE USED TO DRIVE A LENS BARREL IN A VARI-FOCAL APPARATUS

[75] Inventor: Syunji Nishimura, Ohmiya, Japan

[73] Assignee: Fuji Photo Optical Co., Ltd., Japan

[21] Appl. No.: 977,243

[22] Filed: Nov. 24, 1997

[30] Foreign Application Priority Data

Nov. 29, 1996 [JP] Japan .................................. 8-333105

[51] Int. Cl.$^6$ .................................................. G03B 17/00
[52] U.S. Cl. .............................................. 396/72; 359/704
[58] Field of Search ..................... 396/72, 144; 359/700, 359/694, 704, 829

[56] References Cited

U.S. PATENT DOCUMENTS

3,142,239 7/1964 Meixner .................................. 359/829
5,018,832 5/1991 Terunuma et al. .................. 359/694 X
5,701,206 12/1997 Sasaki et al. ......................... 359/704

*Primary Examiner*—W. B. Perkey
*Attorney, Agent, or Firm*—Price, Heneveld, Cooper, DeWitt & Litton

[57] ABSTRACT

A helicoid structure is disclosed that includes a male helicoid provided on an inner barrel and a female helicoid provided on an outer barrel. The female helicoid includes long female crests having engagement ends positioned near a forward end of the outer barrel and short female crests having engagement ends positioned further from the forward end of the outer barrel. At least one of the short female crests is connected to an adjacent long female crest by a guiding crest respectively formed along a plane extending orthogonally to an axis of the outer barrel. When the inner barrel having the male helicoid is rotated relative to the outer barrel having the female helicoid in order to assemble the inner barrel into the outer barrel, the engagement ends of the male helicoid crests are guided by the guiding crests so that the inner barrel may be rotated without any linear movement relative to the outer barrel.

5 Claims, 7 Drawing Sheets

HELICOID STRUCTURE USED TO DRIVE A LENS BARREL IN A VARI-FOCAL APPARATUS

BACKGROUND OF THE INVENTION

This invention relates to a helicoid structure used to drive a lens barrel together with a photographing lens held therein along an optical axis in a zoom lens apparatus, vari-focal apparatus or the like adapted to vary a focal distance of the photographing lens.

A zoom lens apparatus or a vari-focal apparatus usually uses a mechanism for moving the lens barrel together with a photographing lens held therein back and forth along an optical axis and thereby to vary the focal distance of the photographing lens. Some of such lens barrel driving mechanisms have a helicoid structure. With a mechanism of this type, a movable lens barrel which holds a photographing lens is rotatably received by a stationary lens barrel. The movable lens barrel has a male helicoid formed on its outer peripheral surface while the stationary lens barrel has a female helicoid formed on its inner surface. The female helicoid is designed for engagement with the male helicoid. The movable lens barrel is rotated around the optical axis relative to the stationary lens barrel so that the movable lens barrel may be moved back and forth relative to the stationary lens barrel depending on the direction in which the movable lens barrel is rotated.

In the case of the above-mentioned known helicoid structure, rotation of the movable lens barrel relative to the stationary lens barrel necessarily causes the movable lens barrel to move back and forth relative to the stationary lens barrel so long as the male helicoid is in engagement with the female helicoid. As one counter measure to overcome this inconvenience, it has been proposed to provide an intermediate lens barrel adapted to receive the movable lens barrel, on one hand, and to be received by the stationary lens barrel, on the other hand. In addition, there is provided a mechanism functioning to prevent the movable lens barrel from rotating so that rotation of the intermediate lens barrel causes it to move back and forth relative to the stationary lens barrel and at the same time causes the movable lens barrel to move back and forth relative to the intermediate lens barrel. However, the helicoid structure employing such arrangement has various disadvantages as will be described below.

In order to assure that the movable lens barrel is prevented from rotating, there must be provided a latch member designed for engagement with an appropriate portion of the movable lens barrel, and this engagement must be maintained during linear movement of the movable lens barrel. To achieve this, the helicoid mechanism must be constructed so that the latch member is never disengaged from the movable lens barrel even when the latch member is moving back and forth together with the intermediate lens barrel and operatively associated with the stationary lens barrel so as to be prevented from rotating together with the intermediate lens barrel.

Clearly, operative association between the stationary lens barrel and the intermediate lens barrel, as well as operative association between the intermediate lens barrel and the movable lens barrel, occur through the helicoid structure. This means that the movable lens barrel must be rotated relative to the intermediate lens barrel when the movable lens barrel is telescopically received by the intermediate lens barrel and the intermediate lens barrel must be rotated relative to the stationary lens barrel when the intermediate lens barrel is telescopically received by the stationary lens barrel. In conflict with this requirement, the latch member is to prevent the movable lens barrel and itself from rotating by engaging respective predetermined locations of the stationary, intermediate, and movable lens barrels. Accordingly, the presence of the latch member will necessarily obstruct these lens barrel segments to be smoothly assembled by rotating the movable lens barrel and the intermediate lens barrel. To solve this problem, the latch member is constructed in the form of a separable member or a screw-mountable member so as to be incorporated in the helicoid structure after the respective lens barrel segments have been assembled together. As a result, the number of parts is increased and operation of assembly becomes complicated.

SUMMARY OF THE INVENTION

In view of the problems described above, it is a principal object of the invention to solve these problems by providing a helicoid structure for driving the lens barrel in a vari-focal apparatus so improved that, even if the lens barrel assembly is attached to the camera body after the performance inspection of the photographing optical system, the lens barrel assembly itself having been inspected may be attached to the camera body without requiring any jigs or any additional parts for mounting of the latch member.

The object set forth above is achieved, according to the invention, by a helicoid structure used to drive a lens barrel in a vari-focal apparatus, that comprises a male helicoid formed on an outer peripheral surface of an inner barrel and a female helicoid formed on an inner peripheral surface of an outer barrel having a forward end. The female helicoid includes a plurality of long female crests having engagement ends at which the male helicoid initially engages the female helicoid and which are positioned near the forward end of the outer barrel. The female helicoid further includes a plurality of short female crests having engagement ends that are positioned further from the forward end of the outer barrel as compared to the engagement ends of the long female crest. The long female crest and the short female crests are alternatingly arranged on the outer barrel. The female helicoid additionally includes at least one guiding crest connecting the engagement ends of at least one of the short female crests to an adjacent one of the long female crest that is positioned on a side of the connected short female crest that faces away from the forward end of the outer barrel. Each guiding crest is formed along a plane extending orthogonally to an axis of the outer barrel.

To assemble the inner barrel having the male helicoid into the outer barrel, the inner barrel is inserted into the outer barrel until the male crests on the inner barrel bear against the guiding crests on the outer barrel. From this state, rotation of the inner barrel relative to the outer barrel causes the engagement ends of the male helicoid crests on the inner barrel to be guided along the guiding crests so that the inner barrel rotates relative to the outer barrel without engagement of the male helicoid with the female helicoid, i.e., without linear movement of the inner barrel relative to the outer barrel. Such step of rotation allows the latch member or the like to be engaged with the predetermined locations. Further rotation of the inner barrel causes the male helicoid crests to be disengaged from the guiding crests and consequently, the male helicoid crests enter respective troughs defined by respective pairs of the short female crests and long female crests. Thereupon, the male helicoid is in engagement with the female helicoid and rotation of the inner barrel causes the inner barrel to move back and forth relative to the outer barrel along the axis.

With the construction described above, the engagement ends of all the short female crests are connected to the corresponding ends of the adjacent long female crests and therefore there is no male helicoid crest adapted to cooperate with the troughs defined between the short female crests having the guiding crests connected thereto and the adjacent long female crests, respectively. This means that the number of the male helicoid crests corresponds to one-half of the number of the female helicoid troughs. As a consequence, there may be a concern that the precision of the helicoid driving might be deteriorated.

Such deterioration is avoided, according to the invention, by a helicoid structure used to drive a lens barrel in a vari-focal apparatus, that comprises a male helicoid formed around an inner barrel and including long male crests and short male crests, and a female helicoid formed on an inner peripheral surface of an outer barrel. The female helicoid includes a plurality of long female crests having engagement ends at which the male helicoid initially engages the female helicoid and which are positioned near a forward end of the outer barrel. The female helicoid further includes a plurality of short female crests having engagement ends which are positioned further from the forward end of the outer barrel than the engagement ends of the long female crests. The long female crests and the short female crests are alternately arranged on the outer barrel. The female helicoid additionally includes a plurality of guiding crests connecting the engagement ends of at least some of the short female crests to an adjacent one of the long female crests, the guiding crest being formed along a plane extending orthogonally to an axis of the outer barrel. Preferably, the long male crests have engagement ends at which the male helicoid initially engages the female helicoid and which are positioned near a rear end of the inner barrel. The long male crest being formed so as to cooperate with troughs respectfully defined between pairs of those short female crests having guiding crests connected thereto and adjacent long female crests having no guiding crest connected thereto. The short male crests have engagement ends which are positioned further from the rear end of the inner barrel and which are formed so as to cooperate with troughs defined between pairs of long and short female crests that have no guiding crest connected thereto. With this structure, when the engagement ends of the long male crest bear against the guiding crest, the inner barrel is adapted to rotate relative to the outer barrel so that the male helicoid initially engages the female helicoid upon disengagement of the long male crest from the guiding crest.

According to this embodiment, some of the short female crests have guiding crests connected to their engagement ends and the remaining short female crests have no guiding crests connected to their engagement ends. The troughs defined on both sides of those short female crests having no guiding crest connected thereto can accept the male crests. The engagement ends of the short male crests are position-adjusted so that these engagement ends of the short male crests may pass outside the engagement ends of the long female crests as the inner barrel is rotated relative to the outer barrel with the long male crests bearing against the guiding crests. In this way, the inner barrel can be rotated relative to the outer barrel with the engagement ends of the long male crests bearing against the guiding crests without any linear movement of the inner barrel relative to the outer barrel. With this arrangement, the number of the male helicoid crests can be more than one-half of the female helicoid crests, and therefore, there is practically no concern that the precision of helicoid driving might be deteriorated.

Preferably, the short female crests having the guiding crests connected thereto and the short female crests having no guiding crest connected thereto are alternately arranged. Thus, a relatively high degree of freedom is available for the relative position of the inner and outer barrels when the inner barrel is inserted into the outer barrel.

While the provision of a plurality of guiding crests allows the male helicoid crests to be guided by the female helicoid troughs with a relatively high stability when the male helicoid is engaged with the female helicoid, the number of the male helicoid crests is correspondingly limited giving rise to concern that the precision of helicoid driving might be deteriorated. To eliminate such a concern, the helicoid structure may be modified such that only one of the short female crests has an engagement end connected to a guiding crest. With such an arrangement, as the inner barrel is rotated relative to the outer barrel, one of the male helicoid crests has its end guided by the single guiding crest and consequently the inner barrel rotates relative to the outer barrel without full engagement between the male helicoid and the female helicoid. Further rotation of the inner barrel causes the male helicoid crest to be disengaged from the single guiding crest. Thereupon, the male helicoid crests enter the troughs respectively defined between the short female crests and the long female crests and then the male helicoid initiates engagement with the female helicoid.

Even if the helicoid structure is formed with no guiding crests, the inner barrel can be rotated relative to the outer barrel without any linear movement of the inner barrel until the male helicoid crests initially engage the female helicoid troughs so long as the engagement ends of the male helicoid crests are appropriately position-adjusted.

These and other features, advantages, and objects of the present invention will be further understood and appreciated by those skilled in the art by reference to the following specification, claims, and appended drawings.

DETAILED DESCRIPTION OF THE EMBODIMENTS

Details of the inventive helicoid structure for driving the lens barrel in a vari-focal apparatus will be more fully understood from the following description of preferred embodiments given hereunder in reference with the accompanying drawings.

Figure 1:
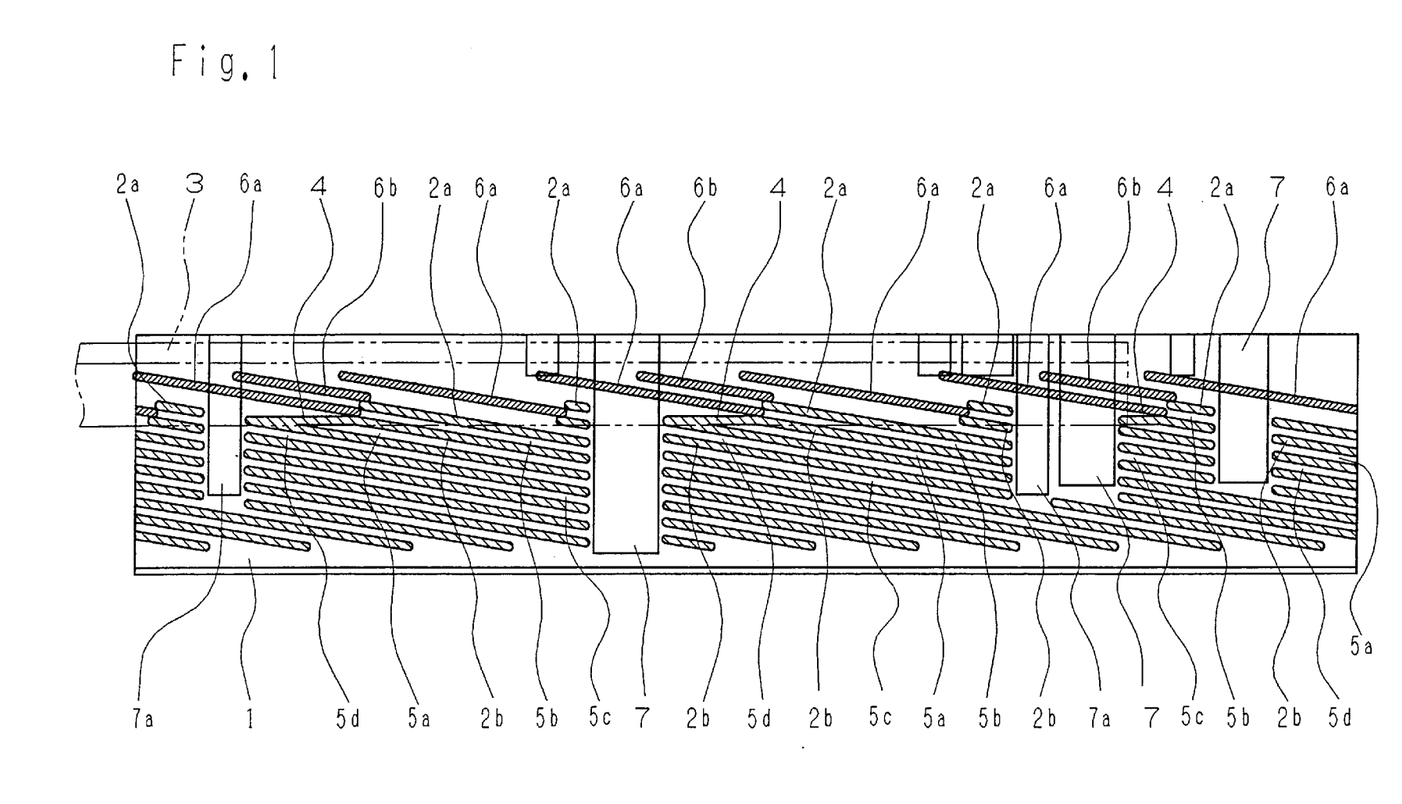
FIG. 1 is a developed view showing the outer barrel provided with female helicoid according to the inventive helicoid structure in combination with corresponding male helicoid as immediately before the male helicoid is brought into engagement with the corresponding female helicoid.
Figure 2:
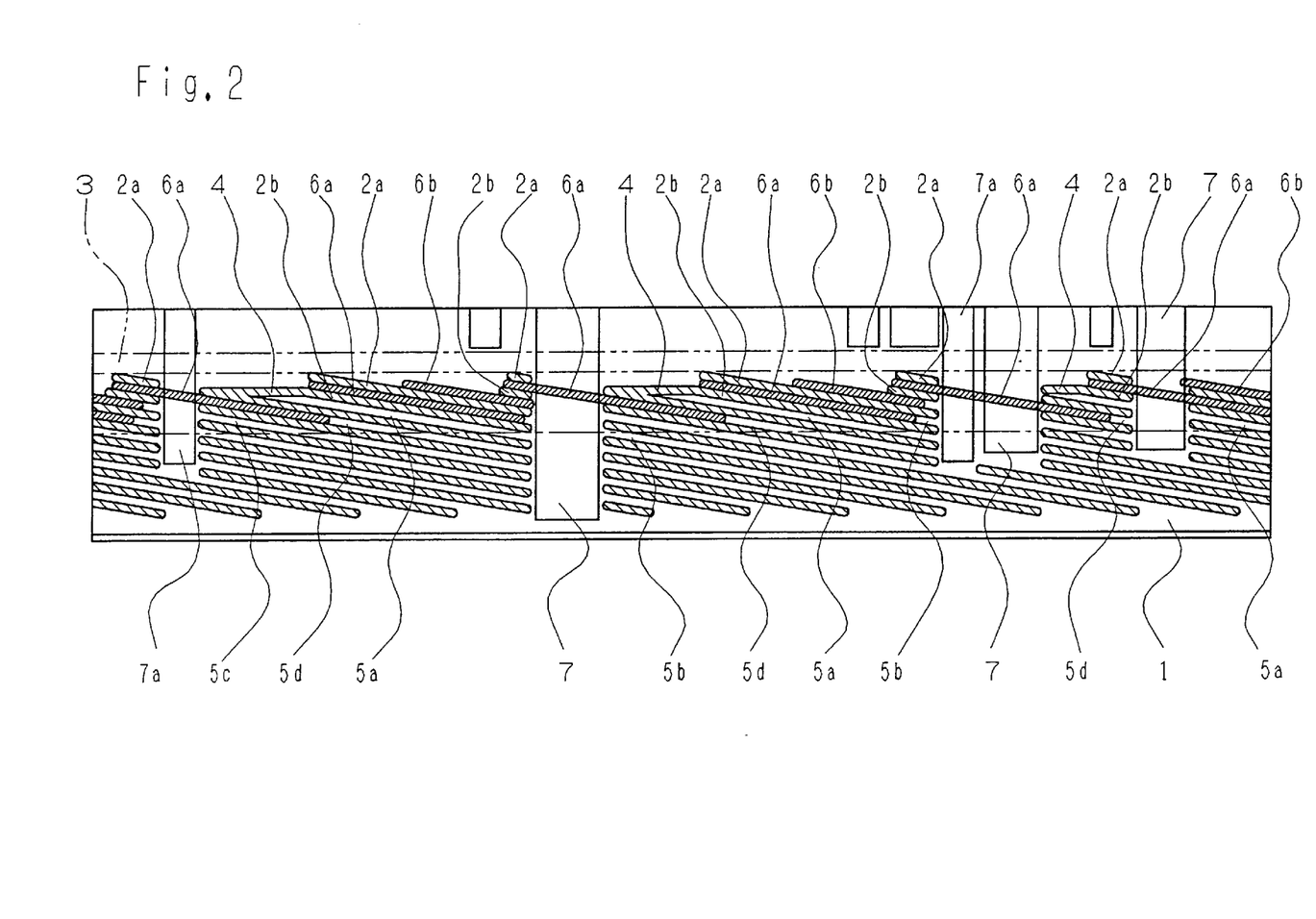
FIG. 2 is a view similar to FIG. 1 showing the situation after the male helicoid has been brought into engagement with the corresponding female helicoid.
Figure 3:
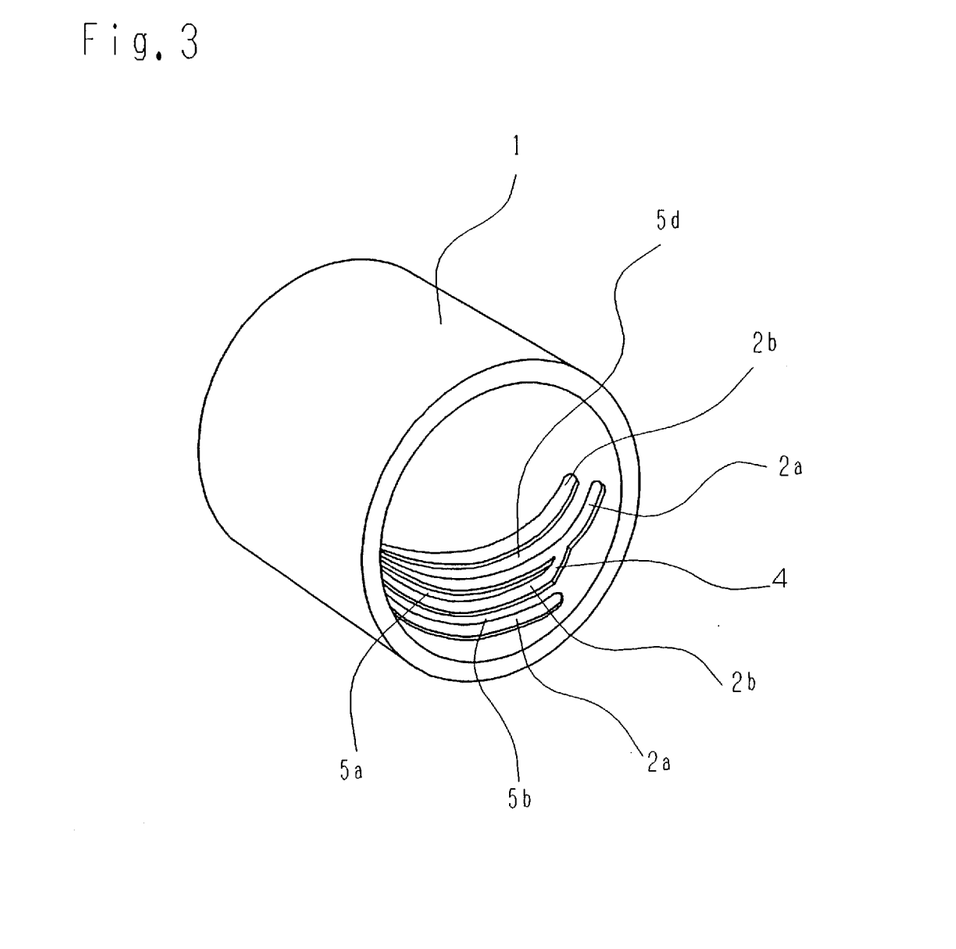
FIG. 3 is a perspective view showing the outer barrel provided with the female helicoid according to the inventive helicoid structure.

FIG. 1 is a developed view of a stationary lens barrel 1 provided as the outermost barrel, showing a female helicoid formed on an inner peripheral surface of stationary lens barrel 1 according to the inventive helicoid structure in combination with a corresponding male helicoid according to the inventive helicoid structure as it would appear immediately before the male helicoid is brought into engagement with the corresponding female helicoid. FIG. 2 is a view similar to FIG. 1 showing the helicoid structure after the male helicoid has been brought into engagement with the corresponding female helicoid. FIG. 3 is a perspective view of the stationary lens barrel 1 as viewed from behind. As will be apparent from these figures, stationary lens barrel 1 has a female helicoid formed on its inner peripheral surface. The female helicoid comprises a plurality of female crests 2. Respective ends of female crests 2, which are adjacent a driving lens barrel 3 to be telescopically inserted into stationary lens barrel 1, are offset from each other axially of stationary lens barrel 1. Engagement of the male helicoid of driving lens barrel 3 with the female helicoid of stationary lens barrel 1 starts from the ends as driving lens barrel 3 is rotated to be inserted into stationary lens barrel 1 . These ends will be referred to hereinafter as the engagement ends. More specifically, the female helicoid comprises long female crests 2a having engagement ends near the forward end of stationary lens barrel 1 and short female crests 2b having engagement ends positioned a little further back from the forward end of stationary lens barrel 1. As shown in FIGS. 1 and 2, long female crests 2a and short female crests 2b are alternately arranged.

The engagement end of at least one of the short female crests 2b is connected to an adjacent one of the long female crests 2a on a side of the short female crest that faces toward the rear of driving lens barrel 3 so as to form a guiding crest 4. Guiding crest 4 is formed along a plane extending orthogonally to the axis of stationary lens barrel 1. As shown in FIGS. 1 and 2, those short female crests 2b having guiding crest 4 connected thereto and those short female crests 2b having no guiding crest 4 connected thereto are alternately arranged. Troughs 5a defined between short female crests 2b having guiding crest 4 connected thereto and long female crests 2a adjacent thereto, are closed by guiding crests 4.

The male helicoid to be engaged with such female helicoid has no portion adapted to be operatively associated with troughs 5a closed by guiding crests 4, as apparent from FIGS. 1 and 2. Of the male crests 6 forming the male helicoid, long male crests 6a are operatively associated with corresponding troughs 5b defined between those short female crests 2b having guiding crest 4 connected thereto and long female crests 2a adjacent thereto. An end of each long male crest 6a, at which the male helicoid of driving lens barrel 3 starts in engagement with the female helicoid of stationary lens barrel 1, is positioned near the rear end of driving lens barrel 3. Short male crests 6b are operatively associated with trough 5c defined between those short female crests 2b and long female crests 2a that have no guiding crest 4 connected thereto. An end of each short male crest 6b at which the male helicoid of driving lens barrel 3 starts in engagement with the female helicoid of stationary lens barrel 1, is further from the rear end of driving lens barrel 3 compared to the engagement ends of long male crests 6a. The male crest 6 corresponding to long male crest 6a, i.e., having an engagement end corresponding to that of long male crest 6a is operatively associated with a trough 5d defined between the short female crest 2b having no guiding crest 4 connected thereto and the long female crest 2a having guiding crest 4 connected thereto.

A distance between the respective engagement ends of long male crest 6a and short male crest 6b as measured along the axis of driving lens barrel 3, is slightly larger than a distance between the surface of guiding crest 4 adjacent the end of stationary lens barrel 1 and the engagement end of long female crest 2a as measured along the axis of stationary lens barrel 1. A distance between the respective engagement ends of long female crest 2a and short female crest 2b as measured along the axis of stationary lens barrel 1, as well as a distance between the respective engagement ends of long male crest 6a and short male crest 6b as measured along the axis of driving lens barrel 3, are smaller than the axial pitch of these helicoids.

Referring to FIGS. 1 and 2, stationary lens barrel 1 may be optionally provided at appropriate locations with mechanical components and openings 7 through which the mechanical components extend. Both long female crest 2a and short female crest 2b are discontinuous along their portions corresponding to these openings 7. Of these openings 7, openings 7a function as locking openings through which respective latch portions 15a of a key plate 15 (as will be described later) are inserted. The respective ends of long female crest 2a and short female crest 2b which are opposite to their respective engagement ends are aligned with one another axially of stationary lens barrel 1. The respective ends of long male crest 6a and short male crest 6b which are opposite to their respective engagement ends are aligned with one another axially of driving lens barrel 3.

Figure 4:
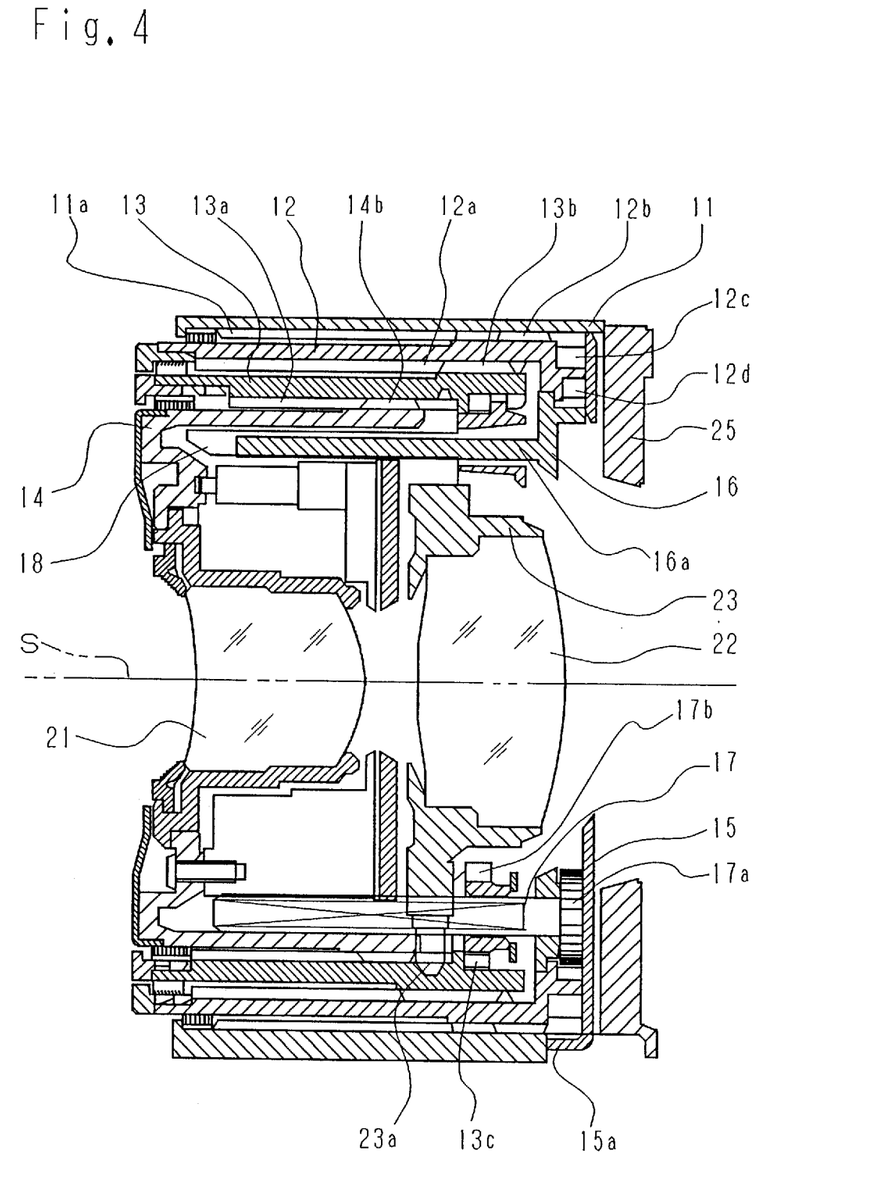
FIG. 4 is an axial sectional view of the optical system in the photographic camera provided with the lens barrel assembly comprising barrel segments operatively associated with one with another by means of the inventive helicoid structure.

FIG. 4 is an axial sectional view of an optical system in a photographic camera provided with lens barrel segments operatively associated together by means of the helicoid structure according to the invention. The lens barrel assembly of this camera comprises a stationary lens barrel 11 provided integrally with a camera body (not shown), a first driving lens barrel 12 adapted to be telescopically received by stationary lens barrel 11, a second driving lens barrel 13 adapted to be telescopically received by first driving lens barrel 12, and a movable lens barrel 14 adapted to be telescopically received by second driving lens barrel 13. Stationary lens barrel 11 includes a female helicoid 11a provided on its inner peripheral surface. Female helicoid 11a comprises a combination of long female crests 2a and short female crests 2b. The first driving lens barrel 12 includes a male helicoid 12b provided on its outer peripheral surface. Male helicoid 12b comprises long male crests 6a and short male crests 6b. First driving lens barrel 12 includes a female helicoid 12a provided on its inner peripheral surface. Second driving lens barrel 13 includes a male helicoid 13b provided on its outer peripheral surface, so that first driving lens barrel 12 is operatively associated with second driving lens barrel 13 through engagement of male and female helicoids 13b and 12a. Second driving lens barrel 13 includes a female helicoid 13a provided on its inner peripheral surface. Movable lens barrel 14 includes a male helicoid 14b provided on its outer peripheral surface, so that second driving lens barrel 13 is operatively associated with movable lens barrel 14 through engagement of male and female helicoids 14b and 13a.

Key plate 15 is movable back and forth axially of stationary lens barrel 11 and operatively associated with stationary lens barrel 11 by means of latch portions 15a. Key plate 15 is operatively associated also with first driving lens barrel 12 in a relatively rotatable relationship with first driving lens barrel 12. Accordingly, key plate 15 is guided by stationary lens barrel 11 together with first driving lens barrel 12 so as to move back and forth along an optical axis S without rotation as first driving lens barrel 12 rotates relative to stationary lens barrel 11 so as to move back and forth relative to stationary lens barrel 11. Key plate 15 has a first linear movement guide key 16 fixed thereto and a key portion 16a extends forward along the optical axis S. A second linear movement guide key 18 supported on the rear end of second driving lens barrel 13 and being movable together with second driving lens barrel 13 is operatively associated with key portion 16a. Specifically, second linear movement key 18 is operatively associated with first linear movement key 16 which prevents second linear movement key 18 from rotating and permits second linear movement key 18 to move linearly together with second driving lens barrel 13. Movable lens barrel 14 is operatively associated with second linear movement key 18 which guides and prevents second linear movement key 18 from rotating around the optical axis S thereof.

The outer peripheral surface of first driving lens barrel 12 is formed around its rear end with a driving gear 12c adapted to be supplied with a driving force from a driving source (not shown) via an appropriate gear train. The inner peripheral surface of first driving lens barrel 12 has an inner gear 12d formed adjacent its rear end. A first transmission gear 17a adapted to be movable back and forth along the optical axis S together with first driving lens barrel 12 is operatively associated with inner gear 12d via an intermediate gear (not shown). First transmission gear 17a is mounted on a rear end of a transmission shaft 17 adapted to rotate in synchronization with first transmission gear 17a. Transmission shaft 17 extends forward in parallel to the optical axis S and slidably carries thereon a second transmission gear 17b adapted to rotate in synchronization with transmission shaft 17. Second transmission gear 17b is operatively associated with the rear end of second driving lens barrel 13 so as to move back and forth together with second driving lens barrel 13. Second transmission gear 17b is adapted to be engaged with an inner gear 13c formed on the inner peripheral surface of second driving lens barrel 13 adjacent its rear end.

A front lens group 21 is held by movable lens barrel 14 and moves back and forth as movable lens barrel 14 moves back and forth. A rear lens group 22 is held by a lens frame 23 which is, in turn, provided with a link pin 23a planted on the outer peripheral surface of lens frame 23. Link pin 23a is operatively associated with linear movement key 18 by extending through a slit of second linear movement key 18 which extends in the direction of the optical axis S, on one hand, and the forward end of link pin 23a is operatively associated with a cam groove (not shown) formed in the inner peripheral surface of second driving lens barrel 13 so as to move along the optical axis S under control of the cam groove, on the other hand. The cam groove is configured so that front and rear lens groups 21 and 22 move back and forth with a predetermined optical relationship maintained between them.

Transmission of a driving force from a driving source (not shown) to driving gear 12c of first driving lens barrel 12 causes first driving lens barrel 12 to rotate around the optical axis S relative to stationary lens barrel 11. Male helicoid 12b of first driving lens barrel 12 is in engagement with female helicoid 12a of stationary lens barrel 11 and therefore rotation of first driving lens barrel 12 around the optical axis S causes first driving lens barrel 12 to move back and forth relative to stationary lens barrel 11 along the optical axis S.

Rotation of first driving lens barrel 12 is transmitted to inner gear 13c of second driving lens barrel 13 via an intermediate gear (not shown), first transmission gear 17a, transmission shaft 17, and second transmission gear 17b, and thereby causes second driving lens barrel 13 to rotate around the optical axis S relative to first driving lens barrel 12. As rotation of first driving lens barrel 12 is transmitted to first transmission gear 17a via the intermediate gear, first transmission gear 17a rotates in the direction opposite to the direction in which first driving lens barrel 12 rotates. Consequently, second driving lens barrel 13 rotates in the direction opposite to the direction in which first driving lens barrel 12 rotates. This means that a differential rotation occurs between first driving lens barrel 12 and second driving lens barrel 13 and consequently second driving lens barrel 13 moves back and forth relative to first driving lens barrel 12 along the optical axis S.

Rotation of second driving lens barrel 13 relative to first driving lens barrel 12 causes movable lens barrel 14 to move back and forth along the optical axis S, since movable lens barrel 14 has male helicoid 14b being in engagement with female helicoid 13a of second driving lens barrel 13, and is prevented from rotating under the effect of second linear movement key 18 operatively associated with key portion 16a of first linear movement key 16. Movable lens barrel 14 holds front lens group 21 which is, therefore, movable back and forth together with movable lens barrel 14 along the optical axis S. While rear lens group 22 is also movable back and forth together with second driving lens barrel 13, a distance over which rear lens group 22 moves is controlled by the cam groove (not shown) formed in the inner peripheral surface of second driving lens barrel 13. Accordingly, a differential movement occurs between front lens group 21 and rear lens group 22 with a predetermined optical relationship maintained between lens groups 21 and 22 so as to achieve a continuous power variation.

Figure 5:
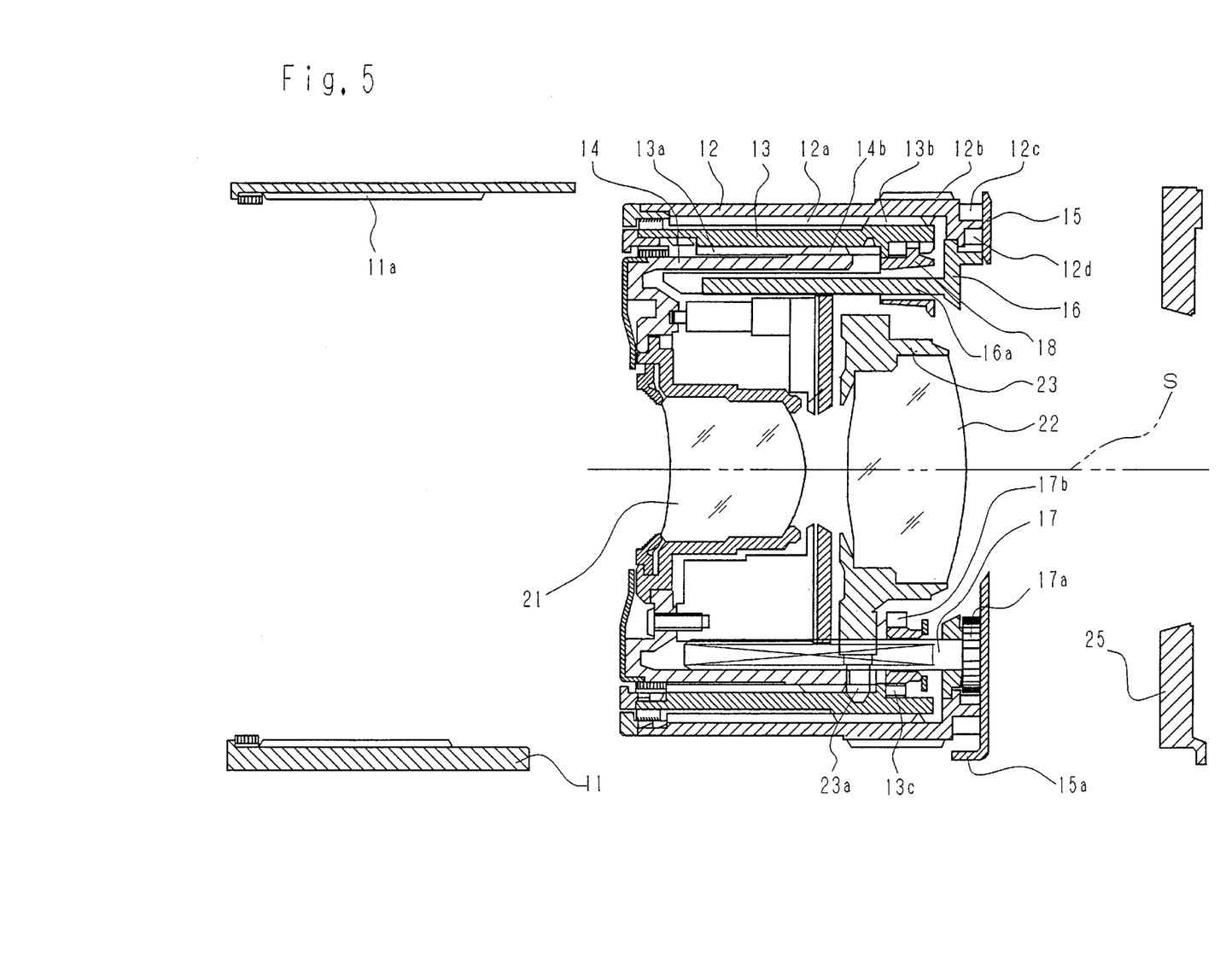
FIG. 5 is an axial sectional view of the optical system in the photographic camera, illustrating the manner in which said lens barrel segments are assembled into the camera body.

The lens barrel segments respectively holding the front and rear lens groups are assembled with stationary lens barrel 11 in the manner described below.

Rear lens group 22 is operatively engaged with the slit of second linear movement key 18 so that rear lens group 22 can move back and forth along the optical axis S, on one hand, and movable lens barrel 14 is operatively engaged with second linear movement key 18 so that movable lens barrel 14 can move back and forth along the optical axis S, on the other hand. Then movable lens barrel 14 is inserted into second driving lens barrel 13 from behind and rotated around the optical axis S so as to be received by second driving lens barrel 13 through slidable engagement between male helicoid 14b and female helicoid 13b. Thereupon, link pin 23a for rear lens group 22 is operatively associated with the cam groove (not shown) of second driving lens barrel 13. Transmission shaft 17 including second transmission gear 17b is linked to the rear end of second driving lens barrel 13 through engagement between second transmission gear 17b and inner gear 13c of second driving lens barrel 13.

Second driving lens barrel 13 is inserted into the first driving lens barrel 12 from the front by rotating second driving lens barrel 13 around the optical axis S. Specifically, male helicoid 13b is guided along the corresponding female helicoid 12a until second driving lens barrel 13 is received by first driving lens barrel 12. First transmission gear 17a is linked to the rear end of transmission shaft 17 and the rear end or first transmission gear 17a of transmission shaft 17 is linked to the rear end of first driving lens barrel 12 so as to engage first transmission gear 17a with inner gear 12d of first driving lens barrel 12.

Key plate 15 is linked to the rear end of first linear movement key 16 so that first linear movement key 16 can move back and forth together with first driving lens barrel 12. Now the optical performance of front lens group 21 and rear lens group 22 is inspected on the basis of the lens barrel assembly obtained from the essential components including first driving lens barrel 12, second driving lens barrel 13, movable lens barrel 14, key plate 15, first linear movement key 16, and second linear movement key 18. With movable lens barrel 14 holding front lens group 21 as well as second driving lens barrel 13 retracted to their rearmost positions, link pin 23a of rear lens group 22 is adjustably positioned relative to the cam groove. Such adjustment allows the optical performance of the objective to be inspected with a predetermined optical relationship maintained between front lens group 21 and rear lens group 22. Then such lens barrel assembly having a desired optical performance is assembled with stationary lens barrel 11.

The lens barrel assembly is inserted into stationary lens assembly 11 from behind the camera body. More specifically, the lens assembly is inserted into stationary lens barrel 11 along the optical axis S after locking tongues 15a of key plate 15 have been angularly positioned so as to be engaged with locking openings 7a. The lens barrel assembly can be inserted into stationary lens barrel 11 along the optical axis S until the engagement ends of the respective long male crests 6a (of male helicoid 12b) formed on the outer peripheral surface of first driving lens barrel 12 bear against the corresponding guiding crests 4 formed on the inner peripheral surface of stationary lens barrel 11. In this manner, the lens barrel assembly can be partially received by stationary lens barrel 11 without rotating the lens assembly. Then, rotation of first driving lens barrel 12 around the optical axis S relative to stationary lens barrel 11 causes long male crests 6a to be guided along the associated guiding crests 4 until they reach the entrance ends of the respective short female crests 2b which are continuous to guiding crests 4. Thereupon long male crests 6a are engaged with troughs 5b defined between short female crests 2b and the adjacent long female crests 2a, respectively. Simultaneously, the remaining male crests 6 are also engaged with the corresponding female troughs 5 defined between respective pairs of adjacent female crests 2. Further rotation of first driving lens barrel 12 causes male helicoid 12b of first driving lens barrel 12 to be fully engaged with the corresponding female helicoid 11a of stationary lens barrel 11 and thereby causes the lens barrel assembly to be received by stationary lens barrel 11.

With the lens barrel assembly thus received by stationary lens barrel 11, a rail-profiled frame 25 may be mounted to the camera body from behind, as illustrated in FIG. 4, to prevent the lens barrel assembly from falling out from stationary lens barrel 11.

After the objective has been moved back for power variation until first driving lens barrel 12 reaches its rearmost position and bears against a stopper member or the like, even if a further driving force is transmitted to first driving lens barrel 12, first driving lens barrel 12 is allowed to rotate without moving back and forth since male crests 6 are disengaged from the corresponding female troughs 5 of female helicoid 11a. Consequently, there is no concern that the stopper member might be damaged.

Figure 6:
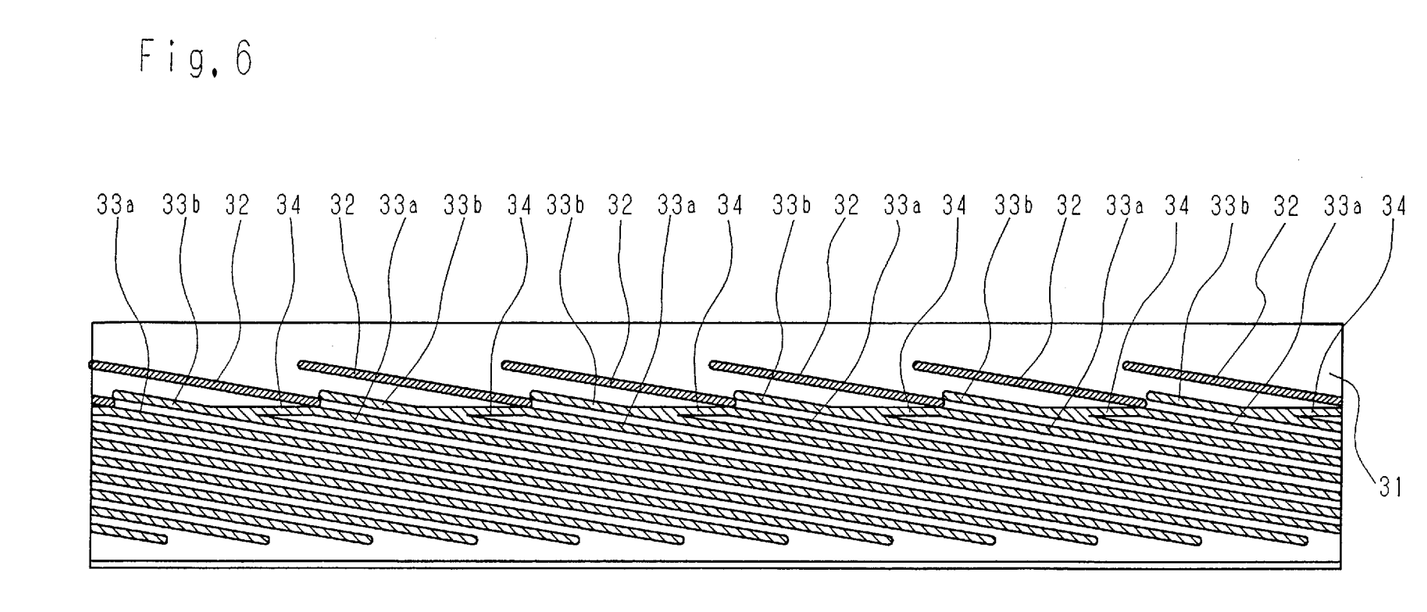
FIG. 6 is a view similar to FIG. 1 showing another embodiment of the inventive helicoid structure.

Another embodiment of the invention will be described with reference to FIGS. 6 and 7. FIG. 6 is a developed view of a stationary lens barrel 31 provided as an outer barrel in combination with, as in the case of FIG. 1, male crests 32 of male helicoids formed around a driving lens barrel provided as an inner barrel. As will be apparent from FIG. 6, female crests 33 form a female helicoid-comprising short female crests 33a and long female crests 33b which are alternately arranged. An engagement end of each short female crest 33a is connected to a long female crest 33b which lies adjacent short female crest 33a on a side thereof that faces rearward so as to form a guiding crest 34. The guiding crest 34 is formed along a plane extending orthogonally to an axis of stationary lens barrel 31.

Each male crest 32, on the other hand, has no portion to be operatively associated with the trough defined by each pair of adjacent female crests connected and closed by guiding crest 34. Accordingly, the number of male crests 32 corresponds to one-half of the number of the female helicoid troughs.

Figure 7:
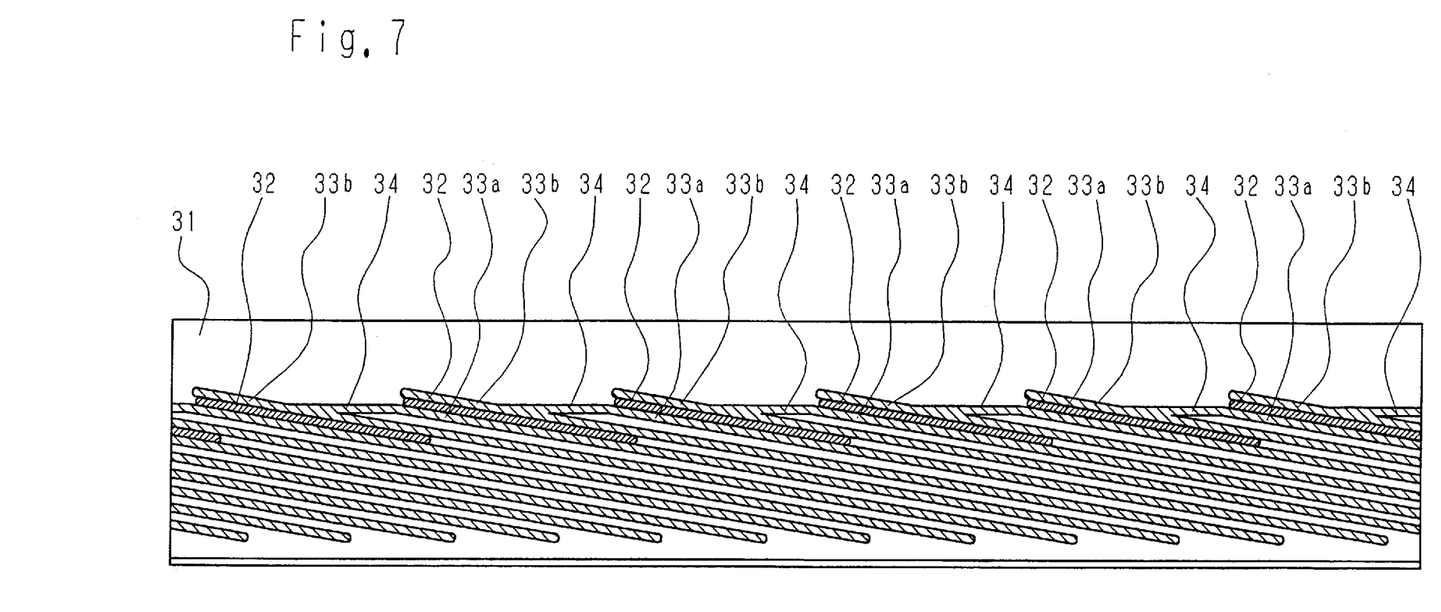
FIG. 7 is a view similar to FIG. 2 showing still another embodiment of the inventive helicoid structure.

To achieve a desired operative association of the driving lens barrel provided with the male helicoid-comprising male crests 32 with stationary lens barrel 31 provided with the female helicoid as illustrated by FIGS. 6 and 7, the driving lens barrel may be inserted into stationary lens barrel 31 until the engagement ends of the respective male crests 32 bear against guiding crests 34 and then the driving lens barrel may be rotated relative to stationary lens barrel 31. The driving lens barrel rotates relative to stationary lens barrel 31 without linear movement until the engagement ends of respective male crests 32 leave the respective guiding crests 34. After the engagement ends of the respective male crests 32 have left the respective guiding crests 34, male crests 32 are guided along the corresponding troughs of the female helicoid, whereupon the driving lens barrel linearly moves into stationary lens barrel 31 through full engagement of the male helicoid on the driving lens barrel with the female helicoid on stationary lens barrel 31.

The helicoid structure according to the embodiment shown by FIGS. 6 and 7 allows male crests 32 constituting the male helicoid to be identically configured and thereby allows the entire helicoid structure to be simplified in comparison with the embodiment shown by FIGS. 1 and 2. However, with the second embodiment, the precision of power variation given by helicoid driving might be less than that of the first embodiment, since the number of male crests 32 is fewer than the number of male crests 6 in the first embodiment shown by FIGS. 1 and 2.

As will be understood from the foregoing description, the inventive helicoid structure used to drive the lens barrel segments in the vari-focal apparatus allows the inner barrel to rotate relative to the outer barrel without any linear movement of the inner barrel when this inner barrel is assembled into the outer barrel. Therefore, even when the inner barrel has, at its given location, the mechanical part destined to be engaged with the corresponding mechanical part on the outer barrel after the inner barrel has been inserted into the outer barrel until a given depth, the mechanical part on the inner barrel can be easily engaged with those on the outer barrel at the given location, whereupon the driving function can be provided by the helicoid structure. Accordingly, when the inventive helicoid structure is used to drive the lens barrel of a photographic camera, the optical performance can be inspected on the basis of the lens barrel assembly comprising the lens barrel segments and then this lens barrel assembly can be attached to the camera body. Furthermore, there is neither a need for use of jigs specified to carry out such inspection nor a need for exchange of parts to attach the lens barrel assembly to the camera body after the inspection. Accordingly, operation of attaching the lens barrel assembly to the camera body is substantially simplified.

The above description is considered that of the preferred embodiments only. Modifications of the invention will occur to those skilled in the art and to those who make or use the invention. Therefore, it is understood that the embodiments shown in the drawings and described above are merely for illustrative purposes and not intended to limit the scope of the invention, which is defined by the following claims as interpreted according to the principles of patent law, including the Doctrine of Equivalents.

The invention claimed is:

1. A helicoid structure for driving a lens barrel in a vari-focal apparatus, said helicoid structure comprising:
    a male helicoid formed on an outer peripheral surface of an inner barrel; and
    a female helicoid formed on an inner peripheral surface of an outer barrel having a forward end, said female helicoid including:
    a plurality of long female crests having engagement ends at which said male helicoid initially engages said female helicoid and which are positioned near the forward end of the outer barrel,
    a plurality of short female crests having engagement ends that are offset further from the forward end of the outer barrel as compared to the engagement ends of said long female crests, wherein said long female crests and said short female crests are alternately arranged on the outer barrel, and
    at least one guiding crest connecting the engagement ends of at least one of said short female crests to an adjacent one of said long female crests that is positioned on a side of the connected short female crest that faces away from the forward end of the outer barrel, wherein each of said guiding crests is formed along a plane extending orthogonally to an axis of the outer barrel.

2. The helicoid structure according to claim 1, wherein only one of said short female crests has an engagement end connected to said guiding crest.

3. A helicoid structure for driving a lens barrel in a vari-focal apparatus, said helicoid structure comprising:
    a male helicoid formed around an inner barrel, said male helicoid including long male crests and short male crests; and
    a female helicoid formed on an inner peripheral surface of an outer barrel, said female helicoid including:
        a plurality of long female crests having engagement ends at which said male helicoid initially engages said female helicoid and which are positioned near a forward end of the outer barrel,
        a plurality of short female crests having engagement ends which are positioned further from the forward end of the outer barrel than the engagement ends of said long female crests, wherein said long female crests and said short female crests are alternately arranged on the outer barrel, and
        a plurality of guiding crests connecting the engagement ends of at least some of said short female crests to an adjacent one of said long female crests, said guiding crests being formed along a plane extending orthogonally to an axis of the outer barrel,
    wherein said long male crests have engagement ends at which said male helicoid initially engages said female helicoid and which are positioned near a rear end of the inner barrel, said long male crests being formed so as to cooperate with troughs respectively defined between pairs of those short female crests having said guiding crests connected thereto and adjacent long female crests having no guiding crest connected thereto, and
    said short male crests have engagement ends which are positioned further from the rear end of the inner barrel and which are formed so as to cooperate with troughs respectively defined between pairs of long and short female crests that have no guiding crest connected thereto,
    whereby, with the engagement ends of said long male crests bearing against said guiding crests, the inner barrel is adapted to rotate relative to the outer barrel so that said male helicoid initially engages said female helicoid upon disengagement of said long male crests from said guiding crests.

4. The helicoid structure according to claim 3, wherein said short female crests having said guiding crests connected thereto and said short female crests having no guiding crest connected thereto are alternately arranged on the outer barrel.

5. A helicoid structure for driving a lens barrel in a vari-focal apparatus, said helicoid structure comprising:
    a male helicoid; and
    a female helicoid having female crests including long female crests having engagement ends at which said male helicoid initially engages said female helicoid and which are positioned near a forward end of the outer barrel, and short female crests having engagement ends which are positioned further from the forward end of the outer barrel as compared to the engagement ends of said long female crests, wherein said long and short female crests are alternately arranged on the outer barrel.

* * * * *